PHOTOSENSITIVE ELECTRONIC SERVO APPARATUS FOR CURVE FOLLOWING

Filed Sept. 3, 1963 4 Sheets-Sheet 1

INVENTORS
EVON C. GREANIAS
PHILIP F. MEAGHER
BY Robert E. Sandt
AGENT

United States Patent Office 3,289,004

Patented Nov. 29, 1966

3,289,004

PHOTOSENSITIVE ELECTRONIC SERVO APPARATUS FOR CURVE FOLLOWING

Evon C. Greanias, Chappaqua, and Philip F. Meagher, Mount Kisco, N.Y., assignors to International Business Machines Corporation, New York, N.Y., a corporation of New York

Filed Sept. 3, 1963, Ser. No. 306,119
9 Claims. (Cl. 250—219)

This invention relates to electronic servo apparatus and more particularly to electronic curve followers for following the outline of patterns or shapes.

While the curve follower is useful in many applications, one of its more demanding duties is that of tracing the configuration of imprinted symbols or characters in an automated reading machine. In such use, little or no control can be exercised over the quality of the raw source data, particularly wherein the machine is called upon to read printed matter already in existence. Not only is print quality subject to degradation through age, but also may suffer from poor quality control in the first instance. Flaws, such as faint, jagged, or broken lines, background smudge and imperfect spacing, are present in varying degrees in printed matter. The human reader can transcend these difficulties by reasoning from context, if all other attempts fail. The machine, on the other hand, is not intelligent, and must, therefore, be specially constructed to alter its mode of operation in response to at least predetermined predictable flows. In the present invention, the electronic curve follower includes means for rejecting background smudging, or noise, means for enhancing weak or fuzzy lines, means for bridging gaps or breaks in the character, and means for forcing the follower to trace out both the interior and exterior of closed figures upon demand.

It is, therefore, an object of this invention to provide an electronic curve follower having means therein for bridging breaks or flaws in the curve being followed.

A further object is to provide an electronic curve follower having means therein for testing each severe discontinuity in the direction of the curve being followed to determinne if the discontinuity is legitimate or caused by a flaw in the formation of the curve.

Another object of the invention is to provide an electronic curve follower means for enhancing the contrast of the boundary between the curve and the background.

Still another object of the invention is to provide means in an electronic curve follower for selectively causing the follower to trace the inside or outside configuration of a closed curve.

Yet another object of the invention is to provide means in an electronic curve follower for anticipating the position of a weak or fuzzy line and enhancing the contrast during the expected intersection of the tracing beam with the poor quality line.

A final and specific object of the invention is to provide an electronic curve follower having three magnitudes of circular trace, the two smaller of which are employed for normal following operations, and the largest employed for seeking the bridge flaws in the curve being followed, or for breaking through the line defining the curve to trace the interior of a closed area.

The foregoing and other objects, features and advantages of the invention will be apparent from the following more particular description of a preferred embodiment of the invention, as illustrated in the accompanying drawings.

Figure 4A:
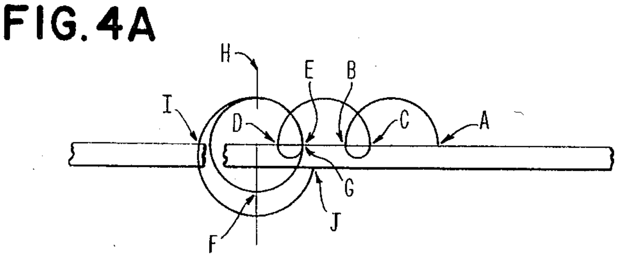
FIG. 4 is a timing diagram of one of the modes of operation of the apparatus of FIG. 1.
Figure 4:
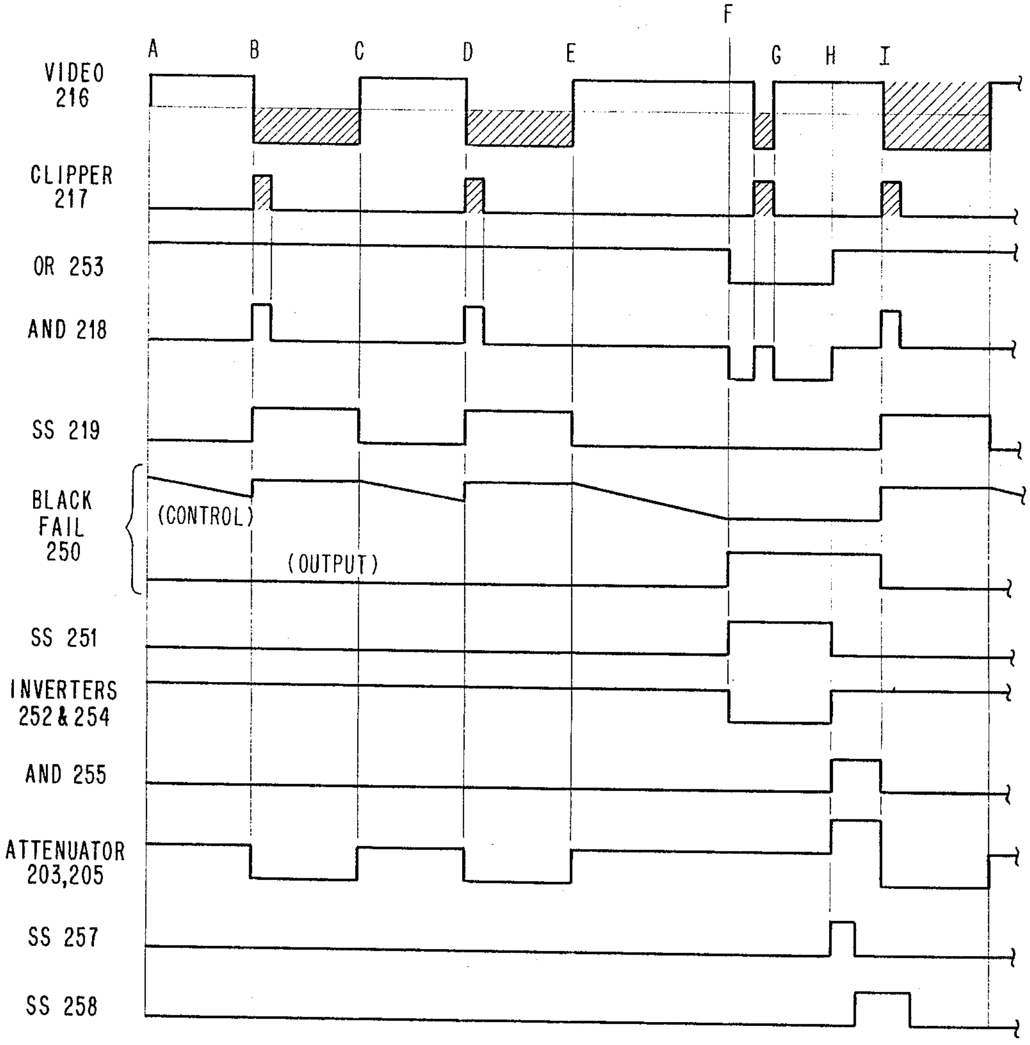

FIG. 4*a* is a diagram of the movement of the tracing beam in performing the mode of operation represented in FIG. 4.

Figure 1:
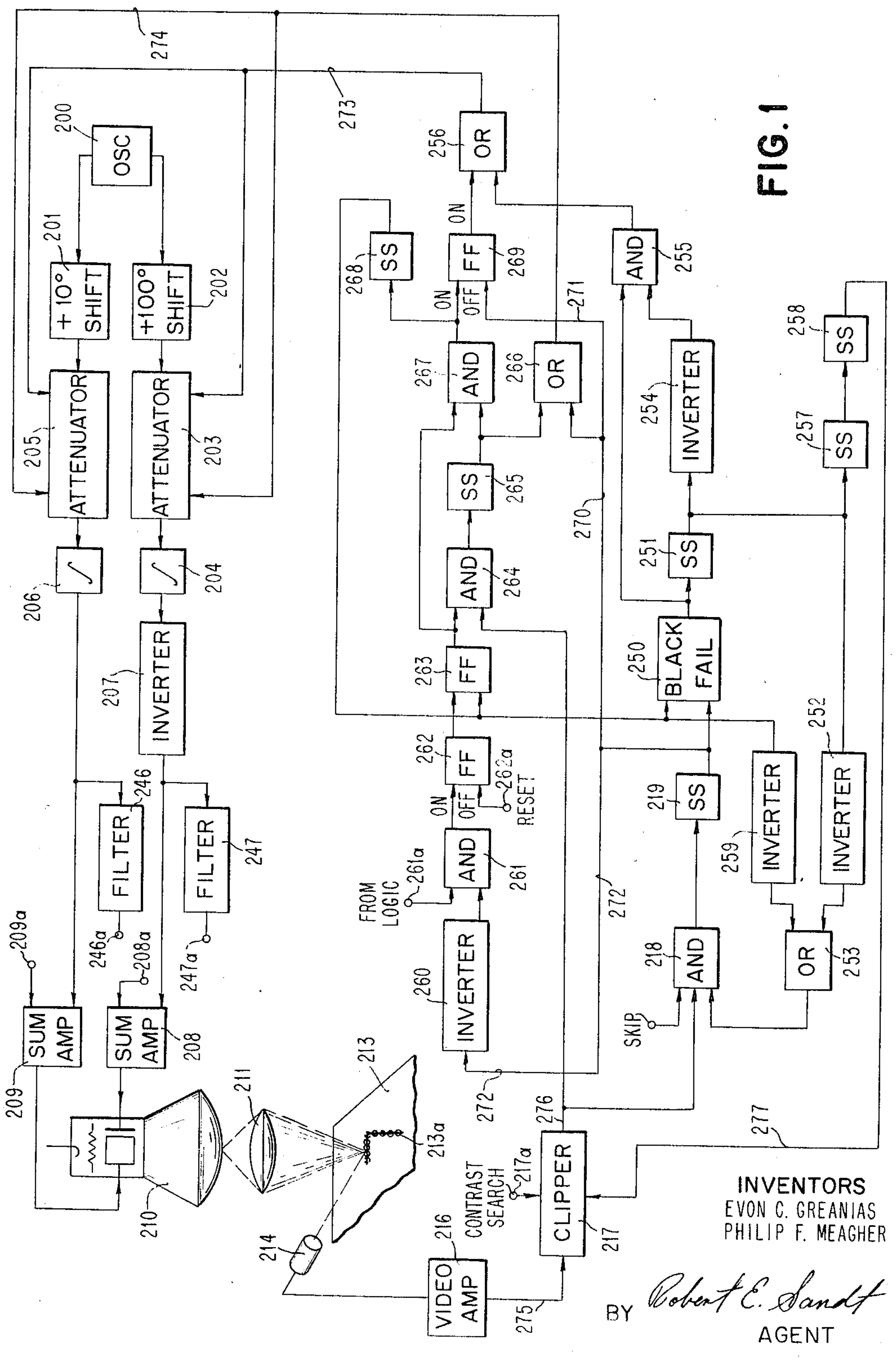
FIG. 1 shows a complete circuit schematic of a curve follower embodying the invention.
Figure 5A:
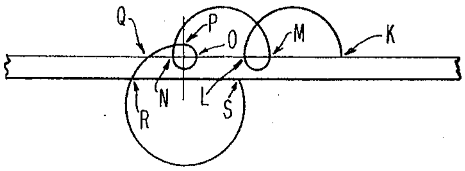
Figure 5:
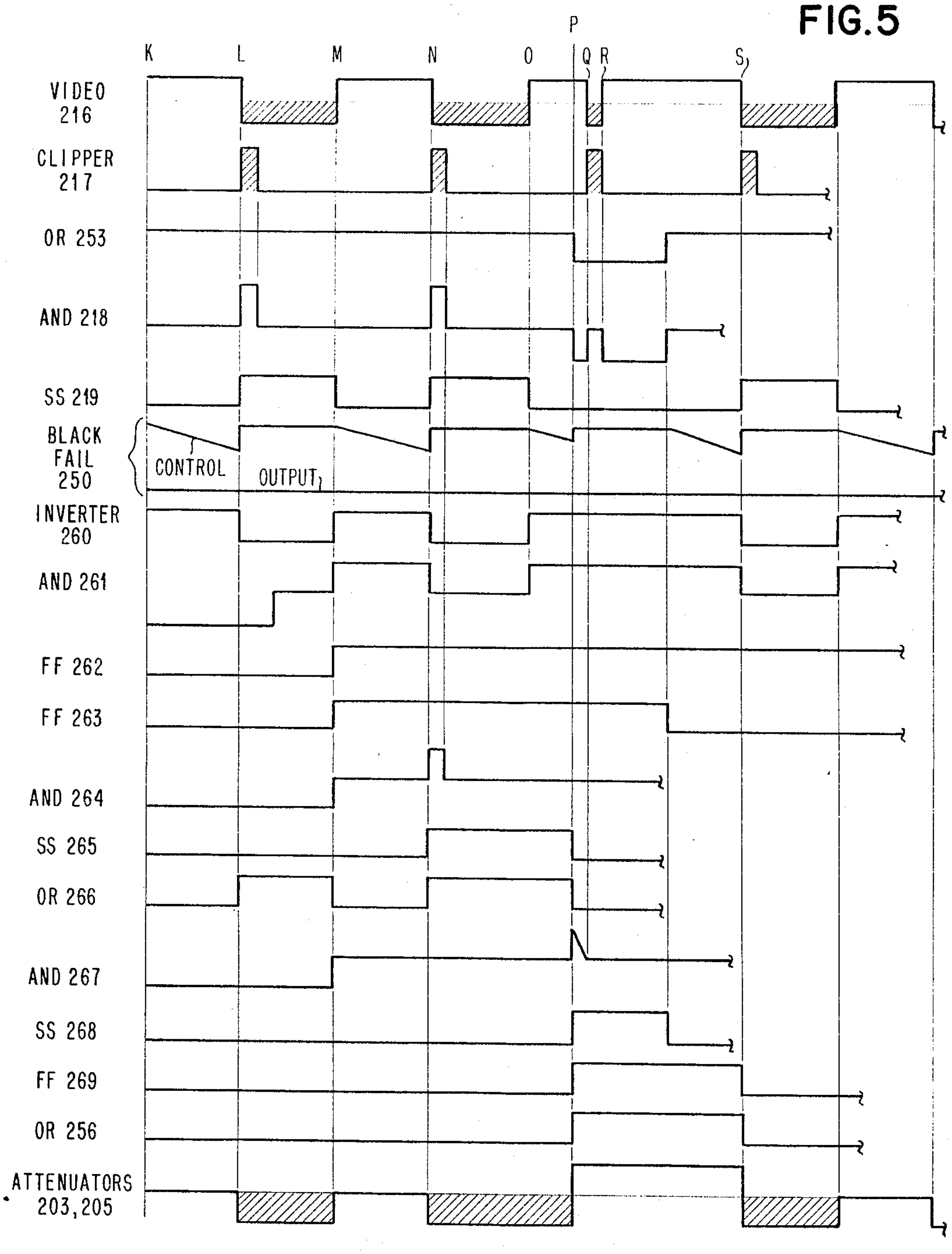

FIG. 5 is a diagram of the movement of the tracing beam in performing a second mode of operation of the apparatus of FIG. 1.

FIG. 5*a* is a diagram of the movement of the tracing beam in performing the mode of operation represented in FIG. 4.

The electronic curve follower shown in FIG. 1 images the illuminated spot on the face of the cathode ray tube 210, by means of suitable optics 211, on a document 213 containing an imprinted character **213*a*. The reflected light from either the background or the less reflective character is detected by the photocell 214, which controls the animation of the electron beam within the cathode ray tube 210 so as to follow the outline of the imprinted character. The basic timing for the following operations is vested in the oscillator 200 which produces a sinusoidal waveform of constant frequency, which waveform is displaced into cosine and sine waveforms by the +10° phase shifting device 201 and +100° phase shifting device 202. The thus produced cosine and sine waveforms pass through the controllable attenuators 205 and 203 into the respective integrators 206 and 204. These attenuators are controllable gain amplifiers having three distinct voltage amplification levels, for purposes to be explained. Since the integrator 204 receives a sine $\alpha$ input, its integrated output will be $-\cos \alpha$. The input to integrator 206 is $\cos \alpha$, and the output $\sin \alpha$. These outputs from the integrators have the same amplitude and frequency (as well as a constant phase relationship), and when applied through the summing amplifiers 208 and 209 to the horizontal and vertical deflection controls of the cathode ray tube 210 will produce a circular trace of constant diameter on the face of the tube. The inverter 207 is inserted to achieve a preferred counterclockwise rotation of the beam. If the circular trace of the cathode ray tube light spot is imaged on the document 213 and intersects the imprinted character 213*a*, the photocell 214 will detect a change in the reflected light. This change is amplified in the amplifier 216 and applied to the clipper 217 which produces an output pulse upon each change from white to black. The pulse output from clipper 217 is passed by the normally active AND gate 218 to fire the single shot 219. This single shot, when fired, produces an output pulse equal to 180° of beam time, or one half the period of the oscillator 200. For the duration of the output pulse from the single shot 219 the OR gate 266 will be activated via line 270 to cause the attenuators 203 and 205 to reduce their gain to produce a small circular motion of the tracing beam. This small circular motion moves the tracing beam entirely within the black of the line, defining the character, for 180°, or half a circle. When the pulse from single shot 219 ceases, the normal gain of the attenuators is restored, and a normal size circular motion of the tracing beam is reinitiated, to cease upon the next black hit. The beam will thus be caused to follow the outline of the character by tracing out a succession of joined circular arcs, consisting of alternating normal radius arcs of variable length, joined by semi-circular arcs of a lesser radius, the normal arcs traversing the white area and the lesser arcs traversing the black area. By alternately integrating the two different amplitude waveforms, the beam is animated to follow the outline of the curve. The inputs 208*a* and 209*a* are employed to initially position the beam proximate to the character 213*a* so as to enable the following action to proceed. Outputs from the follower are taken through filters 246 and 247** to yield time variant voltage waveforms manifestive of the gross horizontal and vertical movement of the cathode ray tube beam in following the character outline, filtered of the rapid circular dither motion. This operation of the curve follower in tracing a character outline is more fully described in the copending application Serial No. 248,585, filed December 31, 1962, now U.S. Patent No. 3,229,100, of Evon C. Greanias, and the explanation hereinabove provides the background for the improvements which comprise the instant invention.

As has been alluded to, any defect or flaw in the formation of the character being traced may lead to an error in the identification thereof. For example, a break at the corner of the number "7" could cause the follower to trace only the horizontal upper bar, and miss the downwardly slanting bar, and thus, misidentify the shape, as a dash or minus sign. Conversely, the follower might block on and follow only the downwardly slanting bar and misidentify the shape as the numeral "1". To obviate this mis-operation, the instant invention provides a so-called "black fail" circuit which detects that tracing the beam has not intersected the black area of the character within 270° of beam time after last leaving the black of the character. This 270° beam rotation in the white area may be occasioned by a legitimate line end, where the normal sized circular trace would sweep around the end of the line, or by a break such as that described with respect to the corner of the "7." In all instances where the tracing beam fails to intersect black within 270° from leaving the last black of the character, the tracing beam will seek to bridge any suspected gap by tracing out an extra large circut. If there is a legitimate line end, the extra large circular scan will test for legitimacy, and, finding no intervening line, will, upon intercepting the opposite side of the line, resume its normal following operation. If there were a flaw, then the extra large circular scan will bridge the break, intercept the line on the far side of the break and resume its normal following operation, as if the break had not existed.

Referring now to FIG. *4a* which illustrates the bridging action, the normal following mode is represented by the trace from A to B, B to C, C to D, and D to E. During this trace, the beam describes a normal sized circular arc illuminating white from A to B. From B to C the small semi-circular arc travels within the black of the line. From C to D the normal circular trace is again followed. Again from D to E the small semi-circular trace travels within the line. This is the normal operation of the follower. When, however, the tracing beam leaves the black of the line at E, it rotates counter-clockwise and finds no line to intercept. At point F, which is 270° removed from point E, the decision to test with a large circle is made. The tracing beam is effectively blinded to seeing black for 180° of beam time starting at point F. Since it is the change from white to black that produces the small circular motion, the tracing beam, blinded to black from F to H, will pass through the line at G at the normal circle size and proceed to point H, retracing its former path. At point H on the trace, the circle size will be expanded to an extra large diameter, and the tracing beam will be effectively susceptible to "seeing black." If there is a break in the line, the tracing beam will intercept the line at point I and resume its normal following operation. If the end of the line is legitimate, the beam will continue its large circular trace and intercept the line on the reverse side thereof at point J, and resume its following operation. Since line breaks may be accompanied by poor quality lines, the contrast or sensitivity of the light detecting circuits is enhanced in the region surrounding point I, wherein the line would be expected to be found, if a break had occurred.

Before examining the circuits of FIG. 1 relative to the operation just described, it is well to digress and define the terms which are applied to the component pieces of equipment. All timing, although the operation is basically asynchronous, is related to beam time of the cathode ray tube, or derivatively the period of the oscillator. Thus, 180° of beam time signifies an event having a time duration equal to one half the period of the oscillator, during which time the circular trace on the cathode ray tube face will have rotated through 180°.

The basic timing device employed in FIG. 1 is the single shot. This device is a monostable multivibrator capable of achieving a second unstable state of fixed duration when a firing potential is applied to the input. A firing pulse, when applied to a single shot will cause the device to assume its second state of stability for the preset period, at the end of which, the circuit will return to its stable state. The single shots employed are generally capacitively coupled to the firing pulse source, and may be fired either by the leading or trailing edge of the firing pulse. A succession of single shots may, therefore, time successive events by coupling each to its predecessor in the chain to operate on the trailing edge of the pulse.

Figure 2:
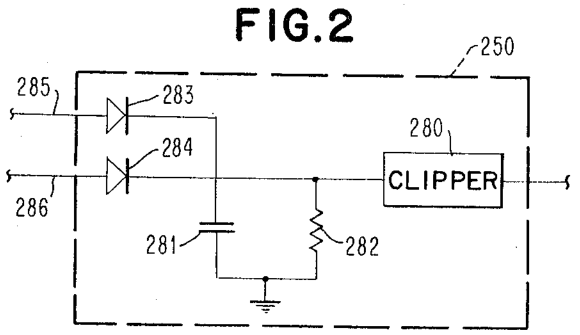
FIG. 2 is a detail of the black fail circuit of FIG. 1.

A second timing device employed in FIG. 1 is the combination of a capacitor, resistor, and clipper identified as the "black fail" circuit 250 in FIG. 1, and further detailed in FIG. 2. This circuit includes the clipper 280 (FIG. 2) which is a device that produces an output response only when the input signal exceeds (positively or negatively) a predetermined level. In the black fail circuit 250 (FIG. 2) the capacitor 281 is discharged through the resistor 282, and charged by positive potentials applied to either of the lines 285 or 286 through diodes 283 or 284. The lines 285 and 286 connect to single shots which provide the charging current for the capacitor 281. Normally, some one of the single shots will supply pulses having a sufficient repetition rate to prevent the charge on the capacitor from falling below that threshold voltage wherein the clipper 280 will produce an output response. If, however, a charging pulse is not received within 270° (beam time) from the cessation of the previous charging pulse, the discharge rate of the capacitor is such that the charge will fall below the threshold of the clipper 280, permitting it to produce an output until the next occurring pulse recharges the capacitor. Thus, the "black fail circuit" will yield an output upon the failure of the connected single shots to fire within 270° from the cessation of the previous pulse.

Another clipper (217) will be hereinafter described in greater detail. It too produces an output response only if the input signal exceeds (positively or negatively) a given threshold. Here, however, the threshold, rather than being fixed, is caused to float in accordance with the past history of operation, and in accordance with special conditions precedent. Its function is to enhance the transition from the white background to the black of the character.

The attenuators 203 and 205 are variable gain amplifiers having three fixed levels of amplification controlled by the potentials on the lines 273 and 274. The absence of a signal on both of the lines 273 and 274 produces a gain of a first magnitude (unity for example). This unity gain produces the normal size circle which animates the beam in the white area outside of the character line. Potential on the line 274 reduces the amplifier gain to less than unity to produce the small circular trace within the black of the line. Finally, a signal on the line 273 boosts the gain above unity to produce the extra large circular scan. As will be seen these controls are never simultaneously applied, as they are mutually exclusive.

The remaining components of FIG. 1, by their very names, connote not only their function in the circuit but also their structure, as these are well known elements in the digital computer art. So as not to obscure the invention, certain elements have been intentionally eliminated. For example, no power supplies have been shown. Additionally, components, such as amplifiers or other coupling elements have not been shown, as these would be supplied by one skilled in the art, if he found, for example, that the load on any given element exceeded its capacity.

The specific circuits for effecting the tracing operation just described are to be found in FIG. 1 starting with the operation of the so-called "black fail" circuit 250. This circuit is connected to the output of the single shot 219, and will produce an output response if the single shot 219 (or single shot 268) does not refire within 270° from the cessation of the previous pulse, as has been explained. The single shot 219 normally supplies the charge lost in the black fail condenser during the time that the beam traces in the white (single shot 219 off). However, from point E to F (FIG. 4*a*) single shot 219 is not fired. The clipper in the black fail circuit will thus produce an output to fire single shot 251, which has a pulse time of 180° of beam time. Single shot 251, therefore, fires at point F and produces a pulse terminating at point H. With single shot 251 fired, inverter 252, acting through OR gate 253 will depotentialize AND gate 218 to prevent the black response from the line hit at G from being passed. This effectively blinds the beam from seeing black from point E to G by preventing a firing impulse from getting through AND 218 to fire single shot 219. When the pulse from single shot 251 ceases after 180° (point H), the black fail circuit will still be active. The lack of a pulse from single shot 251 (through inverter 254) combined with the output from the black fail circuit 250 in AND gate 255 controls the attenuators 203 and 204 (over line 273 from OR 256) to add extra gain and produce the large circular test trace. This large circular trace continues until the tracing beam intersects the line at either the point I or point J. Since the operation is identical in both instances, it is immaterial from a circuit study viewpoint where the interception occurs. With the cessation of the pulse from single shot 251 (at point H), inverter 252, through OR 253, will repotentialize AND gate 218 to permit any black interception after the point H to fire single shot 219. Thus, the interception at point I or J will fire single shot 219, thus inactivating the black fail circuit 250. Single shot 219, will, through OR 266, introduce the small circular scan for the normal following mode. The restoration of the black fail circuit will remove the half energization from AND gate 255 to remove the extra gain from the attenuators 203 and 205 so as not to conflict with the small circle control exercised by the pulse from single shot 219.

A final aspect of the operation of FIG. 1 in bridging a break or flaw in the character is the enhancement of the contrast in the region of an expected intercept of the line beyond the break. Upon cessation of the output pulse from single shot 251 at point H, the extra large bridging scan is initiated. The trailing edge of the pulse from single shot 251 fires a single shot 257 having a duration of 45° beam time. The trailing edge of the pulse from single shot 257 fires single shot 258 whose duration is 90° of beam time. The output pulse from single shot 258 is fed back to clipper 217 to lower its threshold nearer to the black level so as to permit a weak return from a poor line to produce an output response. Thus, the clipper 217 has its clipping level changed during a 90° beam interval starting 45° counter-clockwise from point H, the 90° period being centered about the expected intercept.

The timing of the action of the various components of FIG. 1 which are active in performing the bridging or line end testing operation, whose beam trace is shown in FIG. 4*a*, is shown graphically by the timing chart in FIG. 4. The "video 216" represents the response of the photocell as it appears at the output of the amplifier 216, and is assumed for the sake of clarity to be a simple two level black or white signal, with a sharp transition. The clipper 217 response is shown as a simple pulse, although its response will be somewhat more complex, as will be explained. Every pulse from clipper 217 is repeated in the AND gate 218 except at "G" where the AND gate is blinded to black as previously explained. Every output from AND 218 fires single shot 219 whose output is invariably 180° of beam time as is shown in the timing diagram. AND 218 is inhibited at "G" for the duration of single shot 251 operating through OR 253.

From point A through point E, the normal following operation obtains, with alternate whites and blacks and normal and small size circles controlled by the respective absence or presence of the pulse from single shot 219 operating through OR 266 to control the attenuator 203 and 205. From point E to point F (270°) no black interception is encountered so that the black fail 250 control falls below the threshold to initiate the pulse shown as "output" in the timing digram starting at "F." Since the black fail pulse fires single shot 251 at "F," AND 255, which has been half-activated by the absence of a pulse from single shot 251 (through inverter 254), is still only half-activated at point F (as shown) because of the presence of the pulse from single shot 251. At point H, however, single shot 251 goes down and the black fail circuit 250 remains up so that AND 255 is fully active to operate attenuators 203 and 205 (through OR 256) at full gain to produce the extra large circular scan from point H until the beam intercepts the line beyond the break at point I. At point I the black response from video amplifier 216 is detected by clipper 217 passed by AND 218 (as the inhibit of single shot 250 ceases at point H) to fire single shot 219, which firing recharges the capacitor in the black fail circuit 250 to de-activate it and restore AND 255 to its half-active status to remove the large circle scan. Single shot 219 produces the small circle scan of the normal follower action and the cycle will continue as if the trace had not been interrupted. Had there been no break, but legitimate line end, then the large circular trace would have found no intercept at I, and continued on to J. The only effect (except for contrast enhancement) would be to delay the occurrence of the events shown at I in the timing chart by 180°. Contrast enhancement in the region of an expected intercept at I is controlled by the single shot 258 having a duration of 90°, which single shot is fired by the trailing edge of single shot 257 (45° duration). Single shot 257 is fired by the trailing edge of single shot 251. Thus, when single shot 251 goes off at point H, single shot 257 fires for 45°. At a beam position of northwest single shot 251 ceases and single shot 258 fires for 90° to enhance the contrast. The contrast enhancement from the northwest to southwest beam position (90°) includes the point I where an intercept would be expected were the large circle scan initiated by a line break.

A second use for the extra large circular scan is to break through the line of a closed figure such as "0" or "8." This breaking into the interior may be required in order to positively establish the identity of a given character, as for example, to resolve an ambiguity between an "8" and a "0" where the only distinction in the exterior configurations of the two is the reentrant angles at the midpoints of the sides of the eight. The interior scan will detect the bi-section of the eight versus the unfettered interior area of the zero. Whether an interior scan is required is dictated by the logic, and rendered as a signal to the hub **261*a* labelled "FROM LOGIC." This signal coupled with the absence of a pulse from single shot 219 (through inverter 260) produces an output response from AND gate 261 when the tracing beam is in the white area outside of the character, and tracing the normal size circle. AND gate 261 switches flip-flop 262 on, which remains on until reset by a pulse applied to hub 262*a* upon completion of the interior scan cycle. The transition of flip-flop 262 from OFF to ON switches flip-flop 263. Thus, flip-flop 263 cannot be turned on again until flip-flop 263 is reset and again turned ON. This connection assures only a single break through for each single logic signal. Flip-flop 263 coupled with the next occurring output from clipper 217 (upon the next line intersection) causes AND gate 264 to produce an output and fire single shot 265 having a 270° pulse output. Single shot 219 (180° pulse duration) is fired simultaneously. For 180° both single shot 219 and single shot 265 operate OR gate 266 to cause the attenuators 203 and 205 to reduce their gain and produce a small circular scan. Single shot 265 continues control for an additional 90° period. The beam will thus enter the line, travel within the line for 180°, exit from the line, and continue for 90° in the white at the small circular scan. Upon cessation of the pulse from single shot 265, the trailing edge thereof coupled with the ON status of trigger 263 activates AND gate 267 to switch flip-flop 269 to the ON status and also fire a single shot 268, having a 180° pulse duration. Flip-flop 269 through OR gate 256 produces the extra large circular scan causing the beam to break through the line. To prevent the black intercept from firing single shot 219, the single shot 268 is coupled to AND gate 218 through inverter 259 and OR gate 253 to prevent the clipper pulse from passing. This black blanking prevails for 180°, from 90° before, to 90° following the instant the beam breaks through the line. Single shot 268 is also coupled to the black fail circuit 250 to prevent its initiating the large circle bridging routine previously described. This same single shot (268) switches the flip-flop 263 OFF upon cessation (by means of the trailing pulse edge) thus providing only a single break through cycle. When the beam, now on the inside of the line, next intercepts the line, the response from clipper 217 will be passed by AND gate 218 (as single shot 268 is now down) to fire single shot 219 to resume the normal small circle follower action through OR gate 266. The leading edge of the pulse from single shot 219 also switches the flip-flop 269 OFF, so as to remove the large circle gain control from attenuators 203 and 205 through depotentialization of OR gate 256**. The follower action now proceeds on the inside of the enclosed character with alternate normal and small circles, interrupted only by the break-bridging large circle routine, should such action be dictated.

The beam trace and the relative timing of the components whose operation has just been traced is shown in FIG. *5a* and FIG. 5 respectively. Here, the normal follower action proceeds as before at least from point K to point M. If, during the time from L to M, a signal from logic is received to "go inside" AND 261 will be half-activated when single shot 219 next goes off (concurrent with a change from black to white) at point M. Flip-flops 262 and 263 will both switch at point M. Upon the next pulse from clipper 217 (at point N) AND 264 will be fully activated to fire single shot 265. Single shot 265 will energize OR 266 for 270° to produce the small circular scan until point P of the trace. The trailing edge of single shot 265 and the ON condition of flip-flop 264 produces a momentary output of AND 267 to fire single shot 268 and turn flip-flop 269 ON. Flip-flop 269 through OR 256 produces the extra large circular scan until turned OFF. Single shot 268 (180° duration) inhibits AND 218 for 180° while the beam passes through the line after point P. The trailing edge of the pulse from single shot 268 turns flip-flop 263 OFF preventing a further breaking through the line. Upon the next black intercept at point S, AND 218 is no longer inhibited so as to permit the black clipper pulse to fire single shot 219, the firing of which turns flip-flop 269 OFF to discontinue the large circle, and permit single shot 219 to produce the small circle control of the normal follower operation. All circuits except flip-flop 262 are restored at this time. Flip-flop 262 remains ON, and since it can only switch flip-flop 263 by a change from OFF to ON, flip-flop 263 cannot be switched until flip-flop 262 is reset and reswitched to ON to initiate another cycle. Flip-flop 262 is reset at the end of the recognition cycle.

In retrospect, it is apparent that the operation of the various circuits is essentially asynchronous, in that no master timing circuit compels the conjoint operation of the requisite elements. However, even though the sequencing of the various events depends upon the relative timing of the single shot multivibrators. It should be appreciated that any minor discrepancies in their relative timing are not cumulative. The circuits are all self-phasing to the beam time by virtue of the connections to either the single shot 219 or clipper 217, both of which are activated by the change from white to black, which change is equated to beam time. Although this change may occur at any angular position of the beam, the circuits are always properly phased with the beam.

The relative timing of all of the components of FIG. 1 and their effect on the beam trace has been examined in detail including the enhancement of the contrast in the region of an expected black interception following a suspected line break or flaw in the character. This enhancement is a function of the clipper 217, which has several other important functions which will now be examined.

Figure 3:
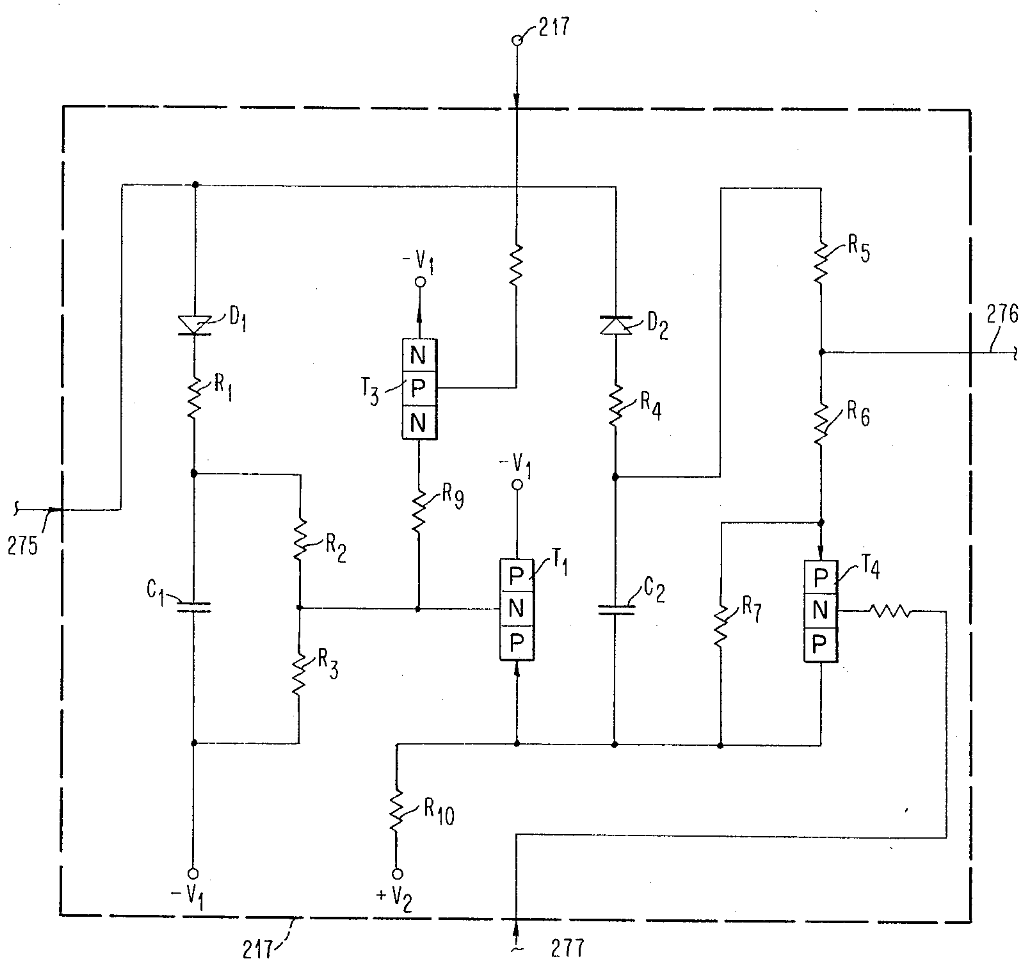
FIG. 3 is a detail of the clipper of FIG. 1.

Referring to FIG. 3 which shows the detailed circuit diagram for clipper 217, the amplified video input enters on the line 275 and is positive-going for the white level response and negative-going for the black level response. The positive white response signal passes serially through diode $D_1$, resistor $R_1$, capacitor $C_1$ to the source of negative potential $-V_1$. This white signal, by virtue of the short $R_1$, $C_1$ time constant will quickly charge the capacitor $C_1$ to a potential level manifestive of the reflectivity of the white background. Capacitor $C_1$ discharges slowly through $R_2$ and $R_3$, the discharge time constant being equal to three or four periods of the oscillator 200 (FIG. 1), or revolutions of the scanning beam. Since in a normal following operation the white background is traversed by the tracing beam approximately every 180° of beam time, the capacitor $C_1$ will store a voltage charge which represents the average reflectivity of the brackground, and will follow slow variations in the reflectivity thereof.

A predetermined fraction (proportional to the ratio of the values of $R_2$ and $R_3$) of the voltage charge on capacitor $C_1$ is applied to the base of the PNP conductivity type transistor $T_1$ connected as an emitter follower between the negative potential source $-V_1$ and the positive potential source $+V_2$ with the serially interposed load resistor $R_{10}$, to which the output lead is attached. The emitter follower circuit thus repeats the voltage excursions of the capacitor $C_1$ without loading the discharge circuit thereof, and provides a variable pedestal voltage for the capacitor $C_2$. The capacitor $C_2$ is charged by a black video return, which is negative relative to the white return. This charging action proceeds from the positive emitter follower output lead through capacitor $C_2$, resistor $R_4$, diode $D_2$, to the line 275, which is relatively negative during the time the tracing beam follows within the black of the line. The time constant of the $C_2$, $R_4$ combinations is sufficiently short so as to permit the capacitor $C_2$ to become fully charged within the black of the line. The discharge circuit for capacitor $C_2$ is through the shunted serially connected resistors $R_5$, $R_6$, and $R_7$, this discharge path having a time constant approximately equal to one-half the period of the oscillator (one-half revolution of the beam). The clipping level output is tapped from the common connection to $R_5$ and $R_6$ and manifests a portion of the charge on the capacitor $C_2$.

During the normal following operation the charge on the capacitor $C_1$ follows the slow variations in the reflectivity of the white background and provides a base or reference against which the black of the character line is compared. During the beam travel in the white area the capacitor $C_2$ is substantially fully discharged (because of the short time constant of its discharge circuit). Upon interception of the black character edge, the line 275 goes relatively negative and charging current for $C_2$ flows through $R_4$ driving the tap of resistor $R_5$ negative relative to the bottom of the resistor $R_7$. This voltage difference across $R_5$, $R_6$, and $R_7$ is manifested in the output line as a sharp negative-going output pulse which recedes toward the positive potential of the emitter follower tap as the capacitor $C_2$ accumulates its charge rapidly. By the time that the tracing beam is ready to leave the black of the line, the capacitor $C_2$ will have accumulated substantially full charge so that black and white discontinuities at the leaving edge of the line will be ignored. When the line 275 achieves a positive potential (relative), diodes $D_2$ blocks current flow. Capacitor $C_2$ loses its charge during the white period, so as to be ready for the black intercept as the beam next enters the line.

During the search for a character, when the tracing beam is totally within the white background area, the capacitor $C_1$ accumulates its charge to manifest the average reflectivity of the background. However, during search time, a potential applied to the terminal 217*a* causes the NPN conductivity type transistor $T_3$ to conduct, thus effectively interposing the resistor $R_9$ in circuit. This interposition of the resistor $R_9$ between the potential source $-V_1$ and the base of transistor $T_1$ lowers the base potential level (more negative or less positive), so as to make the clipping level closer to the black level. This effectively decreases the sensitivity to black during the search, so as to prevent minor smudges and background "noise" from initiating a false following operation. When the beam in its search mode intercepts the character, transistor $T_3$ is turned off by depotentializing hub 217*a*, and the normal following action proceeds.

When a line end or suspected line break is encountered and the large circle bridging routine is employed to test for the line end or seek to bridge the flow, the single shot 258 (FIG. 1) is fired for 90°, which period straddles the expected black intercept. If there were a line break, the quality of the printing on the fringes of the break is suspect. To compensate for any possible degradation of print quality the 90° pulse from single shot 258 is applied through the line 277 to cause the transistor $T_4$ to conduct thus interposing its low impedance in shunt with the resistor $R_7$, and changing the effective voltage divider ratio. The print line 276 therefore, is moved closer to the potential of the white level. This shift permits weaker black signals to be detected for that period when a line intercept is expected.

Thus, the clipper 217 has a self-compensating clipping level, which effectively integrates the reflectivity of the white background, and compares the black signal relative to that average background reflectivity. Additionally, the clipper lowers its sensitivity while the beam travels within the black of the line, so as not to produce spurious "hits" as the beam leaves the black line and traverses smudges at the transition. Finally, the clipping level is adjusted by external controls during search and the large circle routine.

The curve following apparatus hereinabove described provides, in addition to the normal following operation, an extra large circular scan which is used to test legitimate line ends and also to bridge flaws in the formation of the curve being traced as well as to break through the line to trace interiors when such action is dictated. During the flow bridging action, the clipper sensitivity is adjusted to enhance the contrast so as to detect any poor quality printing. By these expedients, marginal printing that otherwise could not be successfully ready by an automated reading machine can now be read. The curve follower in corporating these improvements will produce time variant signals which are a faithful manifestation of the shape of the character being traced. Character flows, background smudging, and poor print quality are minimized by the improved apparatus described above.

While the invention has been particularly shown and described with reference to a preferred embodiment thereof, it will be understood by those skilled in the art that various changes in form and details may be made therein without departing from the spirit and scope of the invention.

What is claimed is:

1. In an electronic curve follower apparatus for following the configuration of a line figure imprinted on a background with a material having a contrasting radiation absorption relative to said background, the said apparatus having means for irradiating the figure with a focused spot of radiant energy animated in a succession of joined arcs of first and second different radii to trace the configuration of the figure under control of a radiation responsive device operable sensitive to the relative absorption of the background and the figure to the incident radiant energy, means for bridging flaws in the imprinted figure and for testing the legitimacy of line ends in the figure, comprising:

(a) means under control of said radiation responsive device for detecting the failure of the spot of radiant energy to intercept the line figure within a given time interval after the last interception;

(b) and means under control of said first named means for animating said spot in a third joined arc for a single continuous predetermined time duration, the said third arc having a radial dimension greater than said first and said second radii.

2. A curve following apparatus for following a line pattern imprinted on a document surface having a different light absorbency than the pattern comprising:

(a) a cathode ray tube having horizontal and vertical beam deflection means and means associated therewith for imaging the spot of light therefrom upon the surface of the document;

(b) a sine and a cosine waveform generator operative to produce respective phase displaced waveforms having the same amplitude and periodicity;

(c) first and second controllable gain amplifiers connected respectively to said sine and cosine waveform generators, each having a normal gain and settable sub-normal and super-normal gains;

(d) first and second waveform integrators connected between said amplifiers and the said beam deflection means;

(e) a photoresponsive device operative to detect the reflected light from said document;

(f) timing means controlled by said photoresponsive device and operative responsive to a sharp diminution in the reflected light for setting the gain of said amplifiers to a sub-normal level for a time equal to one-half the period of said sine and cosine waveforms;

(g) means under control of said timing means for detecting the absence of operation of said timing means for a period in excess of one-half the period of said waveforms, and setting the gain of said amplifiers to a super-normal level, and (h) means responsive to the next following diminution in reflected light for disabling the super-normal gain.

3. In a curve following apparatus for following the configuration of a line figure imprinted on a background with a material having a contrasting absorption material relative to said background, the said apparatus having means for irradiating said figure with a focused spot of radiant energy animated in a succession of joined arcs of first and second radii to trace the configuration of the figure under control of a radiation responsive device operable sensitive to the relative absorption of the background and the figure to the incident radiant energy that improvement comprising:

(a) means for controlling the sensitivity of said radiation responsive device in producing control signals manifestive of a change in absorption of the radiant energy by the background and the line figure material as a function of the average absorption of the background material.

4. A curve following apparatus for following a line pattern imprinted on a document surface having a different light absorbency than the pattern, comprising:

(a) means for imaging a spot of light upon said document and having horizontal and vertical deflection means to move said spot over the surface of the document;

(b) a photosensitive device for detecting the light reflected from said document and producing signals manifest of the intensity thereof;

(c) means for moving said spot of light in a series of semi-circular arcs having a first radius joined by variable length arcs of a second greater radius, wherein the change from the large radius arcs to the small semi-circular arcs is controlled by the interception of the imaged spot with the line figure, and (d) a variable clipping means connecting said last-named means with said photosensitive device and operable to produce an output response to control said last-named means in response to that change in the reflected light intensity when the moving spot intercepts the line, and having means therein for storing a manifestation of the average reflectivity of said background and other means for comparing the manifestation of the reflectivity of said line pattern against said stored manifestation to produce a substantially constant output responsive independent of the relative reflectivities of said background and said line.

5. The apparatus of claim 4 wherein said variable clipping means includes:

(a) a capacitor;

(b) means responsive to the signals manifesting the reflectivity of sai dbackground for rapidly charging said capacitor;

(c) means for slowly discharging said capacitor;

(d) amplifier means for producing a voltage equal to a predetermined fractional part of the voltage charge on said capacitor;

(e) a second capacitor having a charging circuit connected between said amplifying means and said photosensitive means for charging said capacitor when the signal manifests the reflectivity of the line pattern;

(f) a discharge circuit for said second capacitor having a time constant less than the time required for said spot of light to move through 180° of arc;

(g) and means for connecting an output line to said discharge circuit for said second capacitor at a point therein manifesting a predetermined fractional part of the voltage charge thereon.

6. In a curve following apparatus for following the outline of an imprinted character and including an animated light source and a photodetecting means, clipping means for enhancing the response of the photodetecting means to changes in light intensity, comprising:

(a) a forward conducting diode, a resistor, and a capacitor serially connected between said photodetecting means and a fixed potential source to provide a charging path for said capacitor;

(b) a voltage divider connected in shunt with said first capacitor to provide a discharge path for said capacitor;

(c) a transistor amplifier connected as an emitter follower with its base connected to a given point on said voltage divider to reproduce at its emitter a predetermined fractional portion of the voltage charge on said first capacitor;

(d) a reverse conducting diode, a resistor, and a second capacitor serially connected between said photodetecting means and the emitter of the transistor in said first amplifier circuit to provide a charging circuit for said second capacitor;

(e) a voltage divided connected in shunt with said second capacitor to provide a discharge path for said capacitor, said voltage divider having an output tap thereon, a point having a greater resistance between it and said emitter than between it and said second capacitor, whereby the voltage excursions of said output line will be a function of the rate of change of voltage charge on said second capacitor relative to the voltage charge on said first capacitor.

7. The clipping means of claim 6 wherein the said voltage divided connected in shunt with said second capacitor has a terminal portion connected to the emitter of said emitter follower amplifier shunted by a transistor having means for selectively controlling the conduction and non-conduction thereof.

8. Means for controlling the operation of an electronic curve following apparatus to test line ends for legitimacy and to bridge breakes in the formation of the curve being followed comprising:

(a) means for imaging a spot of light upon a document containing the curve to be followed;

(b) means for moving the spot of light in a succession of semi-circular arcs of small radius joined by arcs of varying angularity having a greater radius, the said small arcs travelling totally within the line defining the curve being followed, and the larger radius arcs travelling outside of the line being followed;

(c) means responsive to the travel of said larger radius arc for more than $3/2\pi$ radians for moving said spot of light in an arcuate path having a radius in excess of said greater radius until said spot of light intercepts the line of the curve.

9. An electronic curve follower for tracing both the exterior and interior configurations of a closed line pattern imprinted upon a surface of contrasting radiation absorption material comprising:

(a) radiant energy producing means for producing a focused spot of radiant energy upon the surface containing said line pattern;

(b) a radiation responsive device operable to detect the differences in absorption between the line of said line pattern and the said surface material;

(c) animating means responsive to the detection provided by said radiation responsive device and controlled by said radiation responsive device for animating said radiant energy producing means in a series of joined arcs of respectively different radii to cause said spot to follow along a first edge of the line figure; and (d) means selectively operable during the arcuate motion of said spot to render the control exercised by said radiation responsive device over said animating means inoperative for a time duration sufficient to permit the spot to pass through the line and to follow along the second edge of said line pattern.

References Cited by the Examiner

UNITED STATES PATENTS

| | | | |
|---|---|---|---|
| 2,838,602 | 6/1958 | Sprick | 340—146.3 X |
| 3,019,343 | 1/1962 | Henry | 250—202 |
| 3,159,743 | 12/1964 | Brouillette et al. | 250—202 X |
| 3,229,100 | 1/1966 | Greanias | 250—219 X |

RALPH G. NILSON, *Primary Examiner.*

WALTER STOLWEIN, *Examiner.*

UNITED STATES PATENT OFFICE

CERTIFICATE OF CORRECTION

Patent No. 3,289,004 November 29, 1966

Evon C. Greanias et al.

It is hereby certified that error appears in the above numbered patent requiring correction and that the said Letters Patent should read as corrected below.

Column 10, line 57, after "contrasting" insert -- radiation --; column 11, line 23, for "responsive" read -- response --.

Signed and sealed this 21st day of November 1967.

(SEAL)
Attest:

Edward M. Fletcher, Jr.
Attesting Officer

EDWARD J. BRENNER
Commissioner of Patents